(12) United States Patent
Wakita et al.

(10) Patent No.: US 7,844,163 B2
(45) Date of Patent: Nov. 30, 2010

(54) INFORMATION EDITING DEVICE, INFORMATION EDITING METHOD, AND COMPUTER PRODUCT

(75) Inventors: Yuki Wakita, Tokyo (JP); Takayuki Kunieda, Tokyo (JP); Hideki Ishii, Kanagawa (JP); Takeshi Koyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1480 days.

(21) Appl. No.: 10/939,389

(22) Filed: Sep. 14, 2004

(65) Prior Publication Data

US 2005/0078940 A1 Apr. 14, 2005

(30) Foreign Application Priority Data

Sep. 16, 2003 (JP) ............................ 2003-323752

(51) Int. Cl.
*G11B 27/00* (2006.01)
*H04N 5/93* (2006.01)

(52) U.S. Cl. .......................... 386/52; 386/69; 715/200; 715/500.1

(58) Field of Classification Search .................. 386/52, 386/68; 715/200, 500.1
See application file for complete search history.

(56) References Cited

U.S. PATENT DOCUMENTS

| | | | | |
|---|---|---|---|---|
| 6,336,210 | B1 * | 1/2002 | Taima et al. ................. | 717/100 |
| 6,771,875 | B1 | 8/2004 | Kunieda et al. | |
| 2001/0033296 | A1 | 10/2001 | Fullerton et al. | |
| 2002/0059349 | A1 | 5/2002 | Wakita et al. | |
| 2003/0174160 | A1 * | 9/2003 | Deutscher et al. ........... | 345/716 |
| 2004/0017511 | A1 | 1/2004 | Kunieda | |
| 2004/0030729 | A1 | 2/2004 | Yamagata et al. | |
| 2004/0078496 | A1 | 4/2004 | Kunieda et al. | |
| 2004/0130570 | A1 | 7/2004 | Sakuyama et al. | |
| 2004/0131264 | A1 | 7/2004 | Sakuyama et al. | |
| 2004/0181613 | A1 | 9/2004 | Hashimoto et al. | |
| 2004/0202372 | A1 | 10/2004 | Sakuyama et al. | |
| 2004/0208380 | A1 | 10/2004 | Aoki et al. | |
| 2004/0212843 | A1 | 10/2004 | Kodama et al. | |

FOREIGN PATENT DOCUMENTS

| | | |
|---|---|---|
| EP | 09098392 | 4/1997 |
| JP | HEI 6-15147 U | 2/1994 |
| JP | 06-113253 | 4/1994 |
| JP | 2007-162824 A | 6/1995 |
| JP | HEI 9-98392 A | 4/1997 |

(Continued)

OTHER PUBLICATIONS

Japanese Office Action dated Jun. 23, 2009.

(Continued)

*Primary Examiner*—Thai Tran
*Assistant Examiner*—Girumsew Wendmagegn
(74) *Attorney, Agent, or Firm*—Dickstein Shapiro LLP

(57) ABSTRACT

An information editing device includes an index generating unit that generates, in a plurality of different formats, a plurality of pieces of index information indicative of a list of the pieces of screen image information each for one scene; and a display controlling unit that switches the pieces of index information generated by the index generating unit based on an input instruction of a user.

16 Claims, 13 Drawing Sheets

FOREIGN PATENT DOCUMENTS

| | | | |
|---|---|---|---|
| JP | 2000-357169 | | 12/2000 |
| JP | 2001-350397 A | | 12/2001 |
| JP | 2003-018504 | | 1/2003 |
| WO | WO 97/41504 | * | 4/1997 |
| WO | WO-97/41504 | | 11/1997 |
| WO | WO 9741504 A1 | * | 11/1997 |
| WO | WO-00/54223 | | 9/2000 |
| WO | WO 02/054192 | * | 7/2002 |
| WO | WO-02/054192 A2 | | 7/2002 |

OTHER PUBLICATIONS

H. Aiguo, et al., "RIDEE-SPS: A Presentation System for Realtime Interactive Distance Education Environment," *IPSJ Journal*, vol. 44, No. 3, Mar. 2003.

US 5,715,404, 02/1998, Katseff et al. (withdrawn)

* cited by examiner

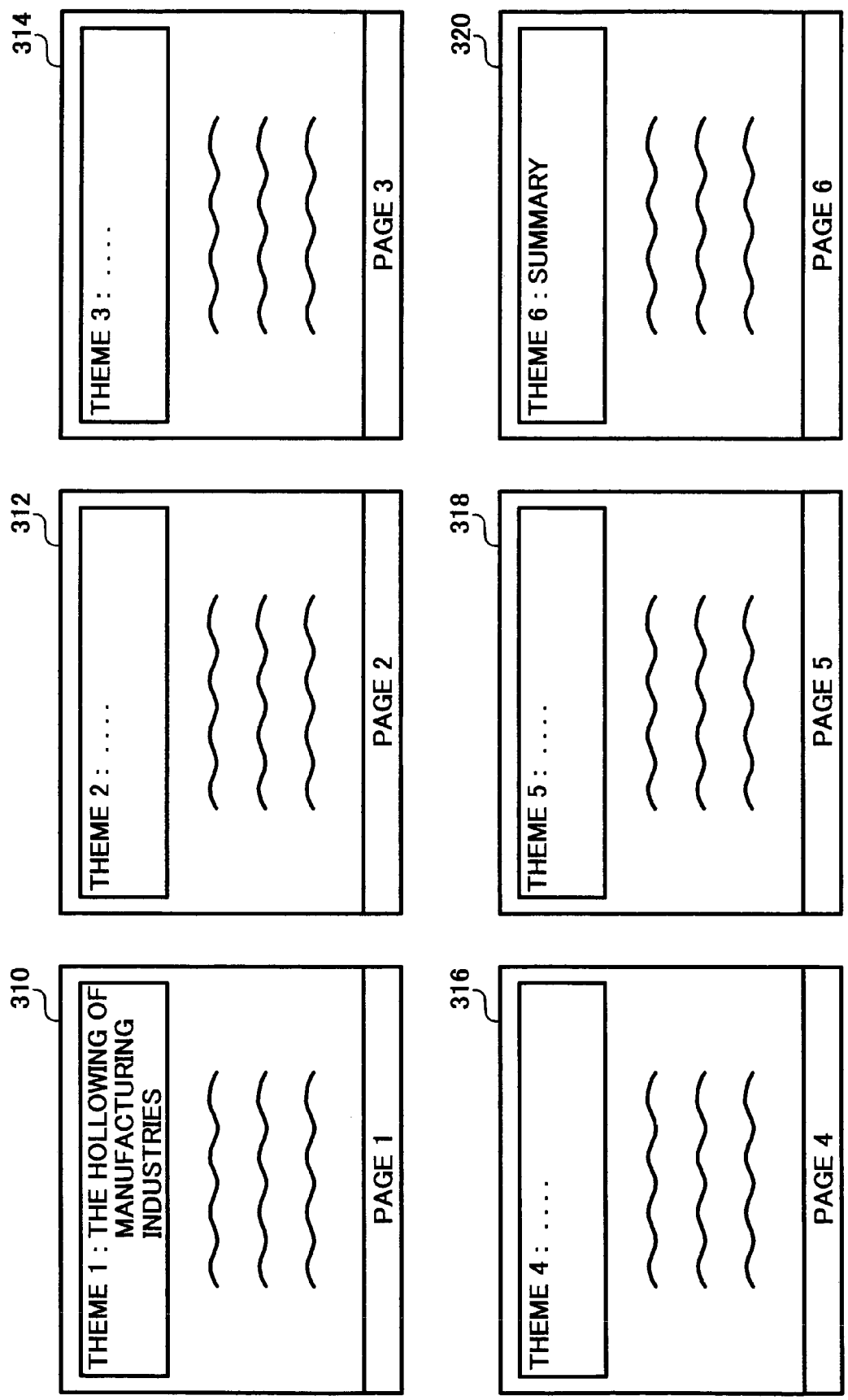

FIG. 4

| COUNTER VALUE | EVENT TYPE | SCREEN IMAGE FILE |
|---|---|---|
| 0 | START PRESENTATION SOFTWARE | |
| 1 | START SHOOTING | |
| 2 | SWITCH TO PAGE 1 | lesson1.ppt |
| 3 | SWITCH TO PAGE 1 | lesson1.ppt |
| 4 | SWITCH TO PAGE 2 | lesson2.ppt |
| 5 | SWITCH TO PAGE 3 | lesson3.ppt |
| 6 | SWITCH TO PAGE 4 | lesson4.ppt |
| 8 | SWITCH TO PAGE 5 | lesson5.ppt |
| 10 | SWITCH TO PAGE 6 | lesson6.ppt |
| 11 | SWITCH TO PAGE 7 | lesson7.ppt |
| 13 | SWITCH TO PAGE 8 | lesson8.ppt |
| 16 | SWITCH TO PAGE 9 | lesson9.ppt |
| 17 | SWITCH TO PAGE 10 | lesson10.ppt |
| 18 | SWITCH TO PAGE 11 | lesson11.ppt |
| 19 | END SHOOTING | |
| 20 | END PRESENTATION SOFTWARE | |

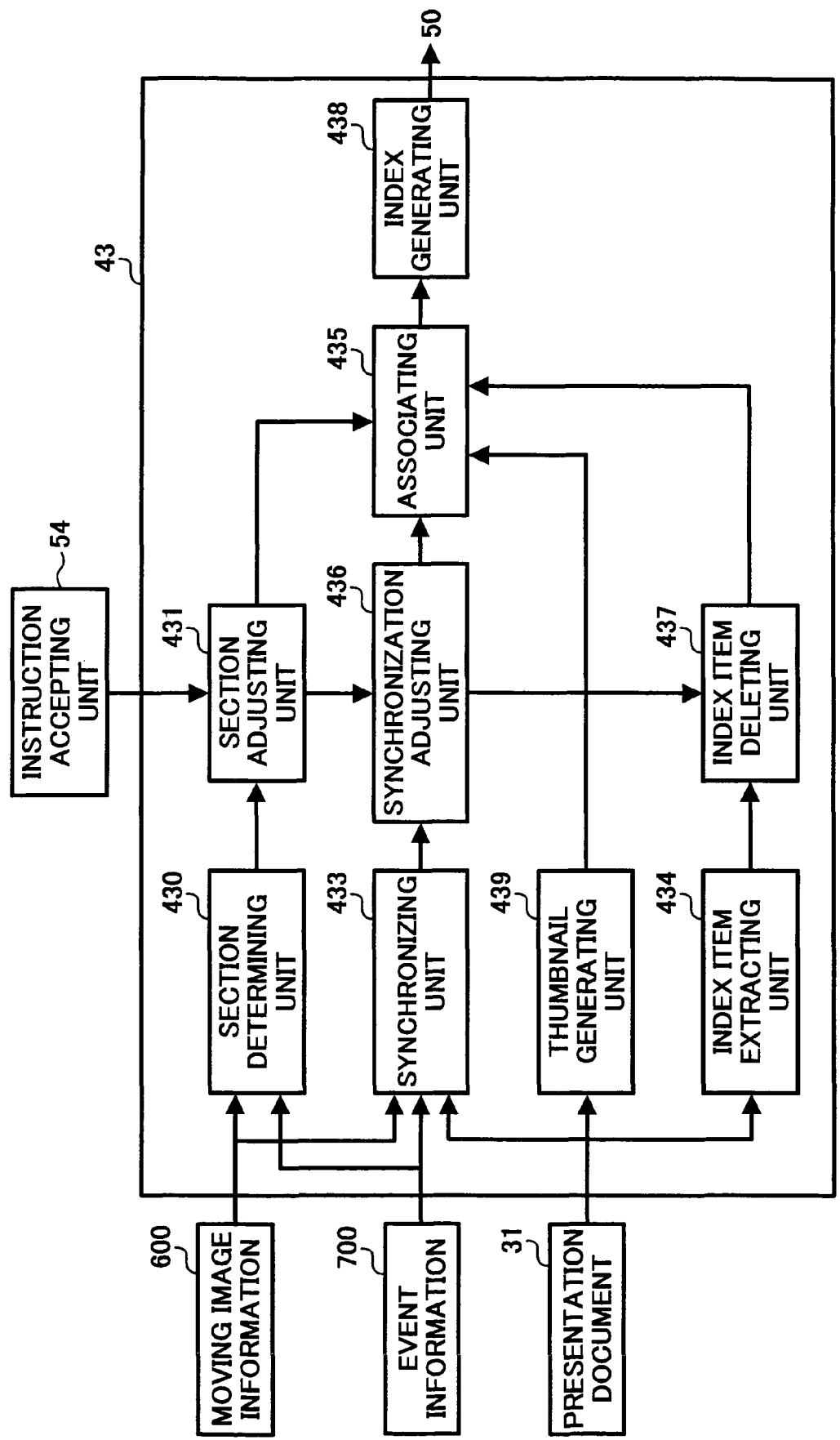

FIG. 7

SCREEN IMAGE INFORMATION : gaiyo.jpg
MOVING IMAGE INFORMATION : 1-0.mpg
SECTION (TIME) : 1m30s
INDEX INFORMATION
  INDEX ITEM : SUMMARY
  CHARACTER COLOR ATTRIBUTE : BLACK FIRST PATTERN
     POSITION : (x1,y1) LENGTH : 5
  SECOND PATTERN
     POSITION : (x1,y1) LENGTH : 5
    THUMBNAIL IMAGE : gaiyo-s.jpg
  THIRD PATTERN
     POSITION : (x1,y2) LENGTH : 10
    THUMBNAIL IMAGE : gaiyo-s.jpg
  FOURTH PATTERN
     POSITION : (x4,y5) LENGTH : 10
    THUMBNAIL IMAGE : gaiyo-s.jpg
         ·
         ·
         ·

SCREEN IMAGE INFORMATION : tyuuki.jpg
MOVING IMAGE INFORMATION : 1-0.mpg
SECTION (TIME) : 1m30s
INDEX INFORMATION
  INDEX ITEM : SUMMARY
  CHARACTER COLOR ATTRIBUTE : BLUE FIRST PATTERN
     POSITION : (x1,y7) LENGTH : 5
  SECOND PATTERN
     POSITION : (x1,y7) LENGTH : 5
    THUMBNAIL IMAGE : tyuuki.jpg
  THIRD PATTERN
     POSITION : (x1,y8) LENGTH : 20
    THUMBNAIL IMAGE : tyuuki.jpg
  FOURTH PATTERN
     POSITION : (x4,y9) LENGTH : 20
    THUMBNAIL IMAGE : tyuuki.jpg
         ·
         ·
         ·

INFORMATION EDITING DEVICE, INFORMATION EDITING METHOD, AND COMPUTER PRODUCT

CROSS-REFERENCE TO RELATED APPLICATIONS

The present document incorporates by reference the entire contents of Japanese priority document, 2003-323752 filed in Japan on Sep. 16, 2003.

BACKGROUND OF THE INVENTION

1) Field of the Invention

The present invention relates to a technology with which it is possible to edit image information recorded so that a plurality of pieces of screen data each for one scene that proceeds with time are associated with moving image data shot at a scene corresponding to the screen data.

2) Description of the Related Art

Some information editing devices can be used to edit image information recorded so that a plurality of pieces of screen data each for one scene that proceeds with time, such as data used at a presentation, are associated with moving image data shot at a scene corresponding to the screen data. However, generally there is need to only view a part of the long video to do the editing.

The required part can be searched using the so called indexing technology. In the indexing technology, a video is divided into many parts along the time axis, and each part is associated with description information to allow searching. In addition, technologies that display an index of moving image data and screen data subjected to an indexing process on a screen are known. Japanese Patent Laid-Open Publication No. 9-98392 and Japanese Utility-Model Laid-Open Publication No. 6-15147 disclose the conventional technologies.

However, in the conventional technology, merely index items are listed for display. Therefore, a flow of the progress of the scenes is difficult to ascertain. That is, it is difficult to know of which scene a presenter has spent a lot of time for describing the screen data. Such a scene is often very important. In the conventional technology, however, when all scenes are later skimmed within a short time, viewing only important parts is impossible.

Also, it is visually difficult to extract only the scenes of interest from the index displayed on the screen within a short time for display.

SUMMARY OF THE INVENTION

It is an object of the present invention to solve at least the problems in the conventional technology.

An information editing device according to an aspect of the present invention allows viewing or editing of image information recorded so that a plurality of pieces of screen image information each for one scene that proceeds with time are associated with a plurality of pieces of moving image data each shot at a scene corresponding to one of the pieces of screen image information. The information editing device includes an index generating unit that generates, in a plurality of different formats, a plurality of pieces of index information indicative of a list of the pieces of screen image information each for one scene; and a display controlling unit that switches for displaying the pieces of index information based on an input instruction.

An information editing method according to another aspect of the present invention allows viewing or editing of image information recorded so that a plurality of pieces of screen image information each for one scene that proceeds with time are associated with a plurality of pieces of moving image data each shot at a scene corresponding to one of the pieces of screen image information. The information editing method includes generating, in a plurality of different formats, a plurality of pieces of index information indicative of a list of the pieces of screen image information each for one scene; and display controlling by switching the pieces of index information based on an input instruction.

A computer program according to still another aspect of the present invention realizes the above information editing method on a computer.

A computer-readable recording medium according to still another aspect of the present invention stores the above computer program.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 3 is a schematic diagram of a presentation document shown in FIG. 2;

FIG. 4 is a schematic diagram of a data structure of an event information list;

FIG. 5 is a functional block diagram of a detailed functional structure of an information file generating unit shown in FIG. 2;

FIG. 7 is a diagram of the structure of the information file generated by the information editing unit;

DETAILED DESCRIPTION

Exemplary embodiments of an information editing device, an information editing method, and a computer product according to the present invention are described below in detail while referring to the accompanying drawings.

Figure 1:
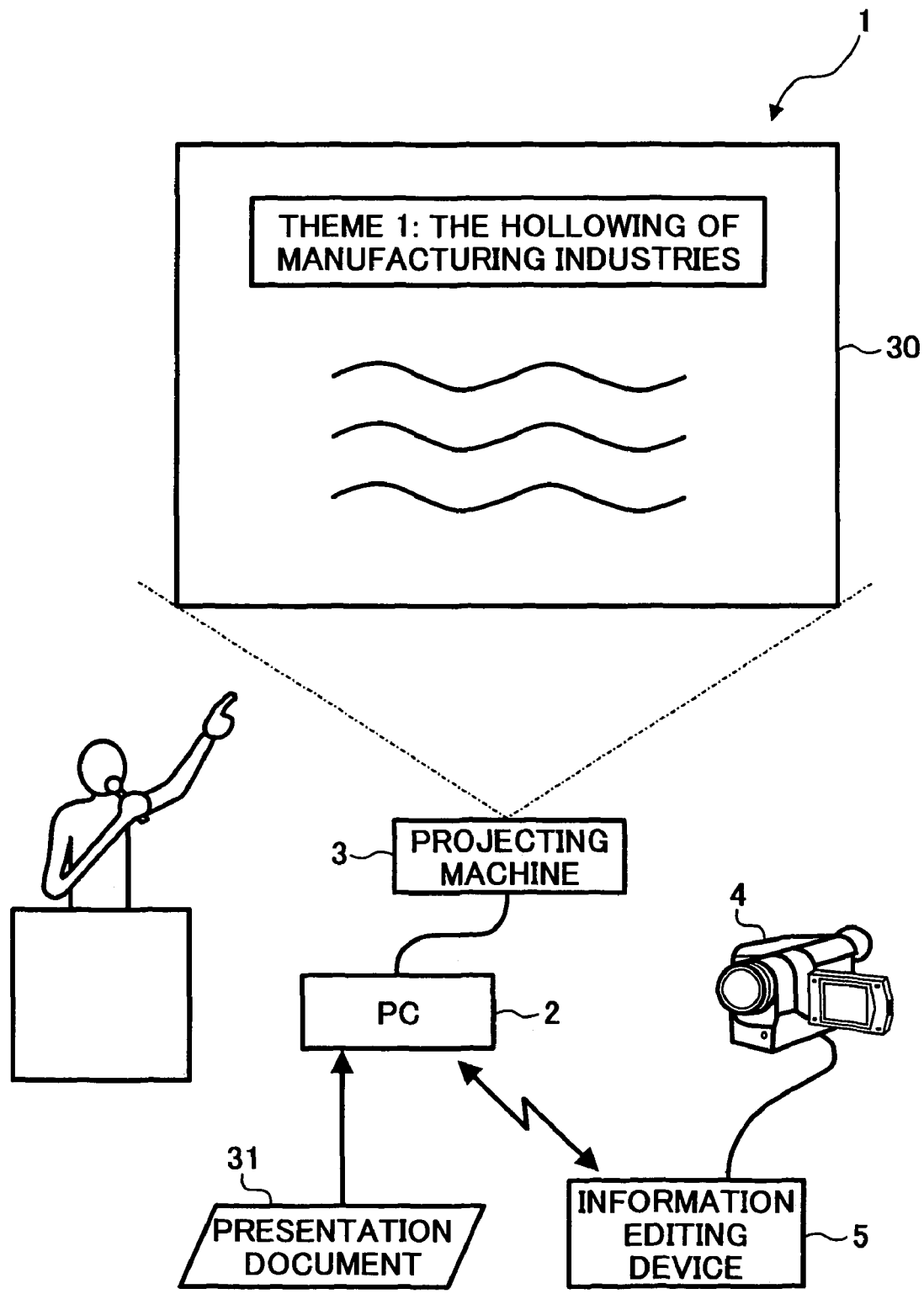
FIG. 1 is a schematic of an information providing system according to an embodiment of the present invention.

FIG. 1 is a schematic of an information providing system according to an embodiment of the present invention.

An information providing system 1 includes a presentation device (such as a personal computer, PC) 2 that stores a presentation document 31. A projecting machine 3, such as a projector, is connected to the presentation device 2, and displays the presentation document 31. A display screen 30 displays an image projected by the projecting machine 3. A digital video (DV) camera 4 with a sound and moving images recording function shoots a presentation. An information editing device 5 edits the moving images and the sounds that are captured by the DV camera 4, ""and presents the edited moving image information to a user.

The DV camera 4 and the information editing device 5 are connected to each other via an interface complying with, for example, IEEE 1394. The presentation device 2 and the information editing device 5 are connected to each other via a communication interface complying with, for example, IEEE 802.11b. If a wireless communication environment is not available, the presentation device 2 and the information editing device 5 may be connected to each other through peer-to-peer connection achieved by normal Ethernet®.

There is no particular restriction of the configuration of the presentation device 2 as long as it simply stores the presentation document 31 and is able to communicate with the projecting machine 3. For example, the presentation device 2 may be an ordinary personal computer (PC).

An editor uses the DV camera 4 to shoot a state in which the presenter is making a presentation while displaying the presentation document 31 on a display screen 30. The editor is a person who wishes to edit the moving images by using the information providing system 1.

Upon completion of shooting, the information editing device 5 obtains the presentation document 31 from the presentation device 2, and further obtains moving image information indicative of the state of the presentation from the DV camera 4. The information editing device 5 then edits the moving picture information. That is, the information editing device 5 generates an information file by associating the moving image information with the presentation document 31. The information file is provided upon request.

The information editing device 5 includes an information editing unit 35. The presentation device 2 includes an event processing unit 32, a keyboard 21, and a mouse 15.

Figure 2:
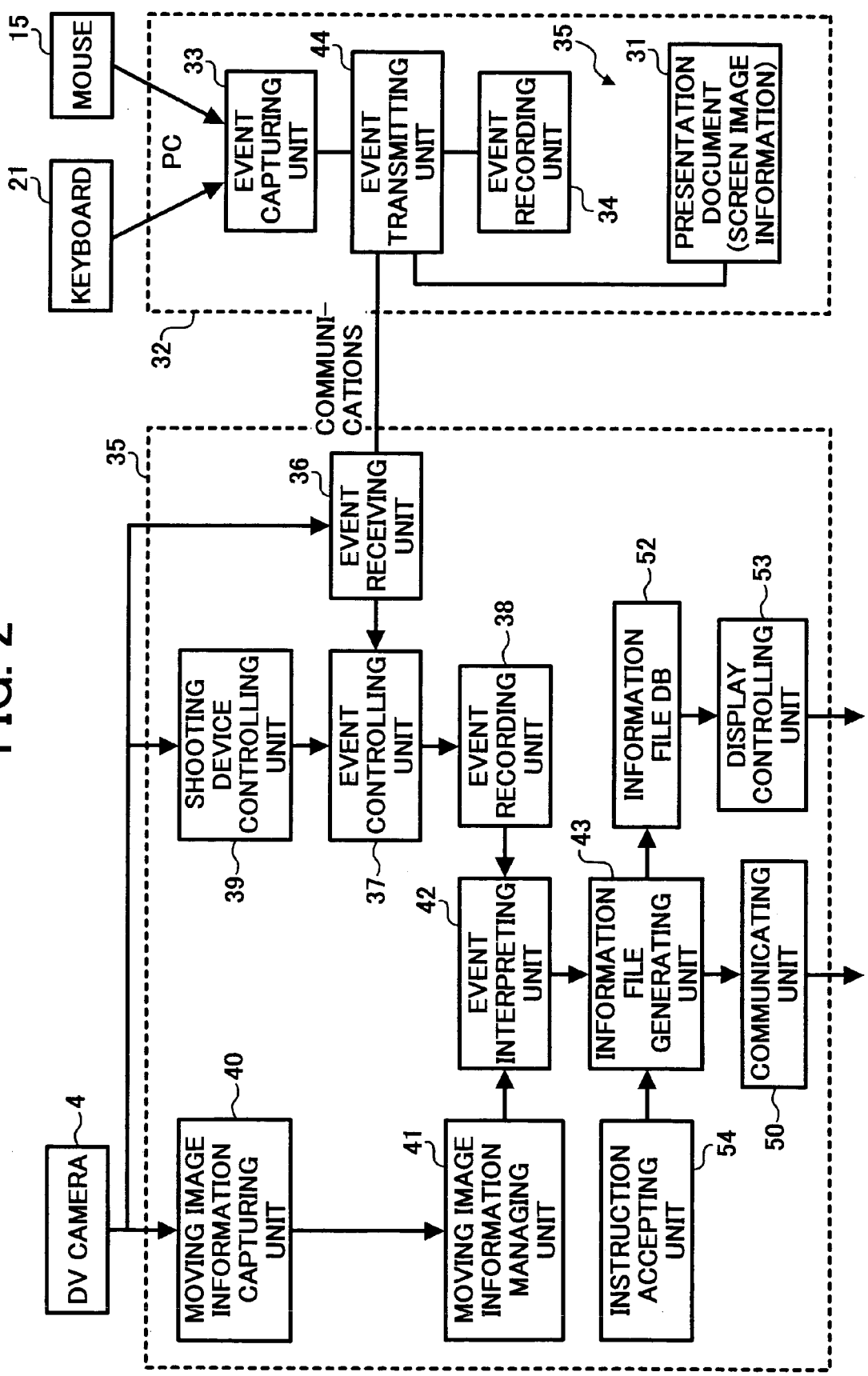
FIG. 2 is a detailed functional block diagram of an information editing unit of an information editing device, and an event processing unit of a presentation device shown in FIG. 1.

FIG. 2 is a detailed functional diagram of the information editing unit 35 and the event processing unit 32. These two units perform a process that is characteristic of the information providing system 1 according to the present invention.

The event processing unit 32 includes an event capturing unit 33 that obtains event information indicative of events regarding the presentation upon input from the keyboard 21 or the mouse 15. An event recording unit 34 records the event information obtained by the event capturing unit 33. An event transmitting unit 44 transmits the event information and the presentation document 31 to the information editing device 5.

On the other hand, the information editing unit 35 includes a event receiving unit 36 that receives the event information and the presentation document 31 from the event transmitting unit 44, the event controlling unit 37 that controls the event information received by the event receiving unit 36, an event recording unit 38 that records the event information, an event interpreting unit 42 that obtains the event information from the event recording unit 38 and interprets the contents of the event information, an information file generating unit 43 that edits the moving image information based on the event information interpreted by the event interpreting unit 42 and generates an information file for storage in an information file database (DB) 52, an instruction accepting unit 54 that accepts an instruction from a user or the like, a communicating unit 50 that transmits the information file to the outside, a moving-image-information capturing unit 40 that captures the moving image information taken by the DV camera 4, a moving-image-information managing unit 41 that manages the moving image information, a shooting device controlling unit 39 that controls the DV camera 4, and a display controlling unit 53 that reads the information file from the information file DB 52 and performs display control over a display unit or the like.

The presentation document 31 will be described in detail while referring to FIG. 3. The presentation document 31 includes screen images 310, 312, 314, 316, 318, and 320 to be displayed on the display screen at a presentation. Each of the screen images 310, 312, 314, 316, 318, and 320 is associated with a page number, and these screen images are displayed in the order of the page number. That is, the screen images forming the presentation document 31 are arranged in the order defined by the creator of the presentation document 31. The presentation document 31 shown in FIG. 3 includes screen images of 6 pages. These images are displayed in the order of the page, that is, page 1, page 2, . . . , based on an instruction by the presenter. The presentation document 31 in the present embodiment is a file created in Power Point (R) manufactured by Microsoft Corporation (R).

Normally, the presenter performs the following operations at a presentation.
1. Start the presentation device 2
2. Start presentation software
3. Start presentation
4. Turn the pages of the presentation document 31 with an operation of the keyboard 21 or the mouse 15
5. End presentation
6. End the presentation software
7. End the presentation device 2

"Turn the pages" means that the presentation document 31 displayed on the display screen 30 is switched from page 1 to the next page, that is, page 2.

The operation described above is associated with a predetermined operation on the mouse 15 or the keyboard 21. For example, an operation of clicking a presentation-software's icon displayed on the display screen of the presentation device 2 with the mouse 15 is associated with an event of starting the presentation software.

The event recording unit 34 records a log of event information. The event transmitting unit 44 transmits the event information to the information editing unit 35 via the communication interface.

The shooting device controlling unit 39 controls the DV camera 4 based on the event information. The event recording unit 38 records not only the event information received from the event processing unit 32 but also event information for controlling the DV camera 4.

For example, when an event of starting the presentation software occurs, this event information is recorded in the event recording unit 38. Furthermore, the shooting device controlling unit 39 starts capturing of moving image information from the DV camera 4. When the presentation software ends, the shooting device controlling unit 39 ends capturing of the moving image information from the DV camera 4. Then, the event controlling unit 37 records event information indicative of an event of ending the presentation software in the event recording unit 38.

The event interpreting unit 42 interprets the contents of the event information. Then, the information file generating unit 43 refers to the contents of the event information interpreted by the event interpreting unit 42 to generate an information file based on the presentation document 31 and the moving image information.

In this manner, the information editing unit 35 can manage the event information of the event in the moving image information captured by the DV camera 4, as well as the moving image information. That is, the moving image information shot and captured by the DV camera 4 is stored with time information defining a lapse of time. Also, the recorded event information is merged by the information file generating unit 43 with the presentation document 31, and is managed in description language (such as HTML or MPEG-7).

The communicating unit 50 transmits presentation information organized by a security level managing unit (not shown) via the network to the outside, that is, to the user.

In FIG. 4, a data structure of an event information list is schematically shown. In the event information list, pieces of event information are arranged in the order of occurrence of the events. Each piece of event information includes a type of the event that occurred, a counter value, and a file name of the screen image (slide). For the counter value, a counter is provided with the use of a CPU or memory for adding a value by one in predetermined units. This counter is reset to a specified value (normally, 0 value) simultaneously at the time of starting a presentation, by way of example, at the time of starting the presentation software. For example, when page 2 is displayed, event information indicating "switch to page 2" is recorded. With this, counter values at the time of starting and ending display of each page can be known.

FIG. 5 is a detailed functional block diagram of the information file generating unit 43 described in FIG. 2. The information file generating unit 43 includes a section determining unit 430, a section adjusting unit 431, a synchronizing unit 433, a thumbnail generating unit 439, an index-item extracting unit 434, an associating unit 435, a synchronization adjusting unit 436, an index-item deleting unit 437, and an index generating unit 438. Here, the index generating unit 438 and the index-item extracting unit 434 form an index generating unit in the present invention.

The section determining unit 430 divides moving image information 600 obtained from the DV camera 4 into a plurality of sections based on event information 700 obtained from the presentation device 2. Specifically, the section determining unit 430 determines a position of a frame recorded at a counter value of event information indicative of a turn of a page as a boundary between sections of the moving image information. That is, a period in which a page is displayed corresponds to one section, and a time when the page is switched to another page corresponds to a boundary between sections.

The section adjusting unit 431 adjusts the length of the section obtained through division by the section determining unit 430. Specifically, when the length of the section determined by the section determining unit 430 is shorter than a prescribed length, a section shorter than this prescribed length, that is, an exceptional section having an exceptional length, is unified into the immediately-preceding or immediately-subsequent section having the prescribed length. Here, the prescribed length is changeable. For example, the editor or the like may specify the length via the instruction accepting unit 54.

The synchronizing unit 433 synchronizes the moving image information 600 and the presentation document 31 based on the event information. That is, each section of the moving image information 600 is associated with one page of the presentation document 31 to be displayed simultaneously at the time of displaying the section.

The synchronization adjusting unit 436 synchronizes the exceptional section of the moving image information 600 with, in place of the page of the presentation document 31 set by the synchronizing unit 433 for synchronization with the exceptional section, a page in synchronization with the section in which the exceptional section is unified.

The thumbnail generating unit 439 generates a collection of scaled-down images of the respective screen images forming the presentation document 31 as thumbnail images.

From the presentation document 31, the index-item extracting unit 434 extracts character information that will serve as items of an index of the moving image information. The associating unit 435 associates the index items extracted by the index-item extracting unit 434 and the scaled-down images, that is, the thumbnail images, generated by the thumbnail generating unit 439 with the screen images on the pages in the presentation document 31, from which the index items are extracted. The index-item deleting unit 437 deletes, as required, an index item extracted by the index-item extracting unit 434.

The index generating unit 438 generates a plurality of pieces of index information of different types from the index items, the scaled-down images, that is, the thumbnail images, and the screen images associated by the associating unit 435, and records these pieces of index information in an information file.

Figure 6:
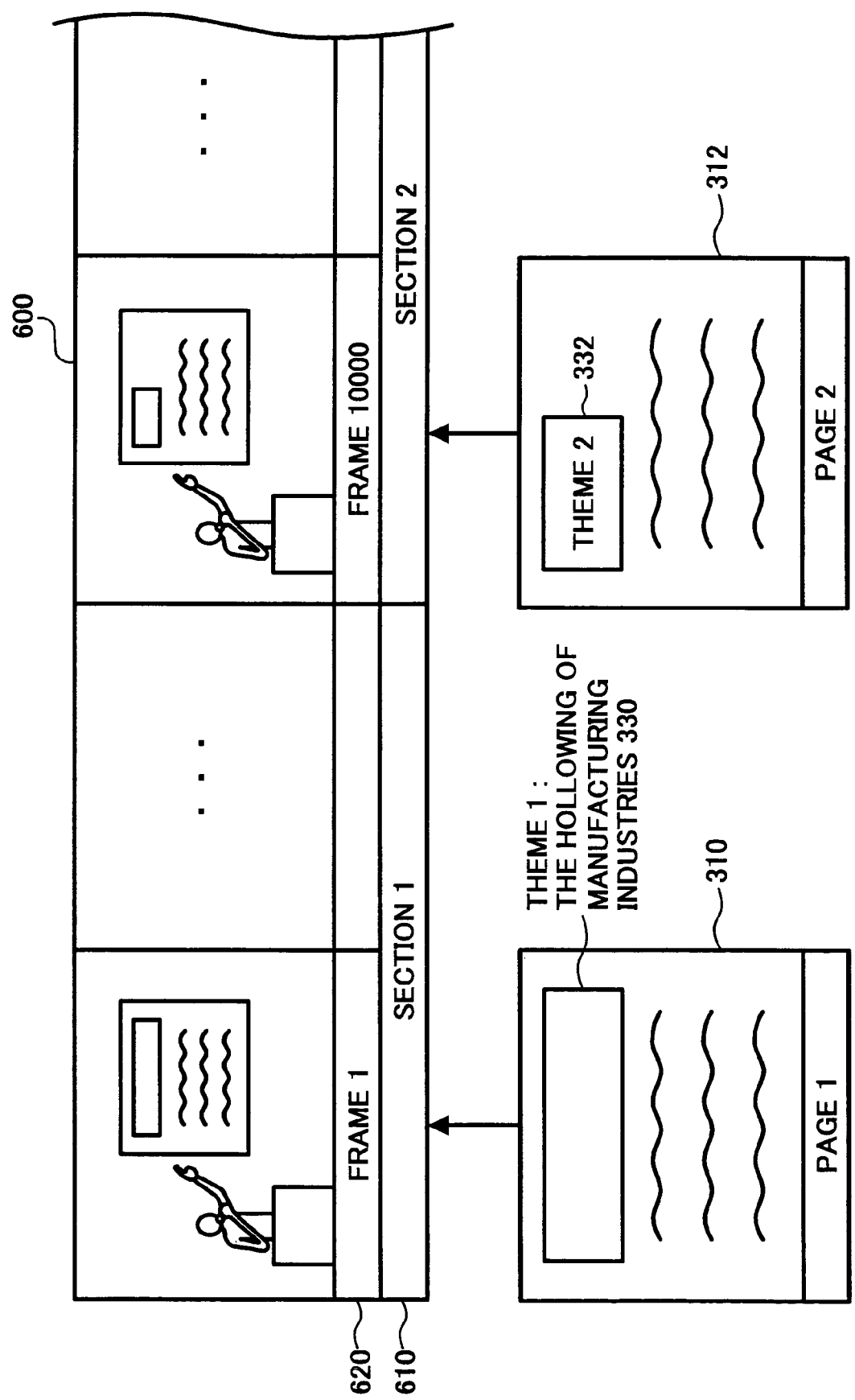
FIG. 6 is a schematic of an information file generated by the information editing unit shown in FIG. 2.

FIG. 6 is a diagram for explaining an example of the information file generated by the information editing unit 35. The information file includes the moving image information 600, the screen images 310, 312, . . . associated with a section 610 of the moving image information 600, and the index information. Here, each section 610 of the moving image information 600 includes a plurality of frames 620. The length of the section 610 is determined by the event information. Since the moving image information 600 is associated with the screen images of the presentation document 31 in this manner, the moving image information 600 and the screen images 310, 312, . . . of the presentation document 31 can be displayed in synchronization.

FIG. 7 is a diagram for explaining the internal structure of the information file. As described in FIG. 6, the information file includes the screen images, the moving image information, and the index information as being associated with one another. The index information includes, as common information, characters to be displayed in the index, a character color attribute, and an index item. Also, six patterns each achieving a different display state on the screen are provided, and each pattern has a position represented by display coordinates on an index screen, a length of the index item, and, if a thumbnail image is to be displayed, a file name of the thumbnail image.

Here, in a first pattern of the index information, the index items are vertically displayed with the same length, and no thumbnail images are displayed. In a second pattern of the index information, the index items are vertically displayed with the same length, and the thumbnail images are displayed. In a third pattern of the index information, the index items are vertically displayed with varied lengths correspondingly to the sections (display times), and the thumbnail images are displayed. In a fourth pattern of the index information, the index items are horizontally displayed with the same length, no thumbnail images are displayed. In a fifth pattern of the index information, the index items are horizontally displayed with the same length, and the thumbnail images are displayed. In a sixth pattern of the index information, the index items are horizontally displayed with varied lengths correspondingly to the sections (display times), and the thumbnail images are displayed.

In the index items of the index information, the character color attribute is changed so that a character color in a section equal to or longer than a first threshold and equal to or shorter than a second threshold is different from the character color in other sections. In the example of FIG. 7, the normal character color of the index items is set as black, and the character color when the section is equal to or longer than the first threshold is set as blue.

Figure 8A:
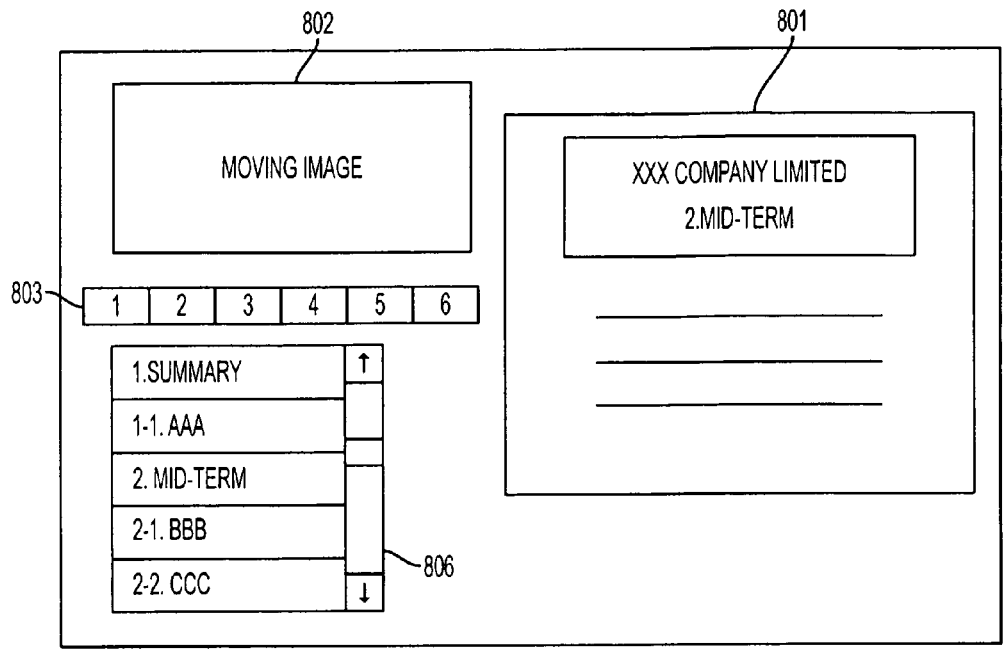
FIGS. 8A-8D are diagrams for explaining examples of index information of first, second, third, and sixth patterns.
Figure 8B:
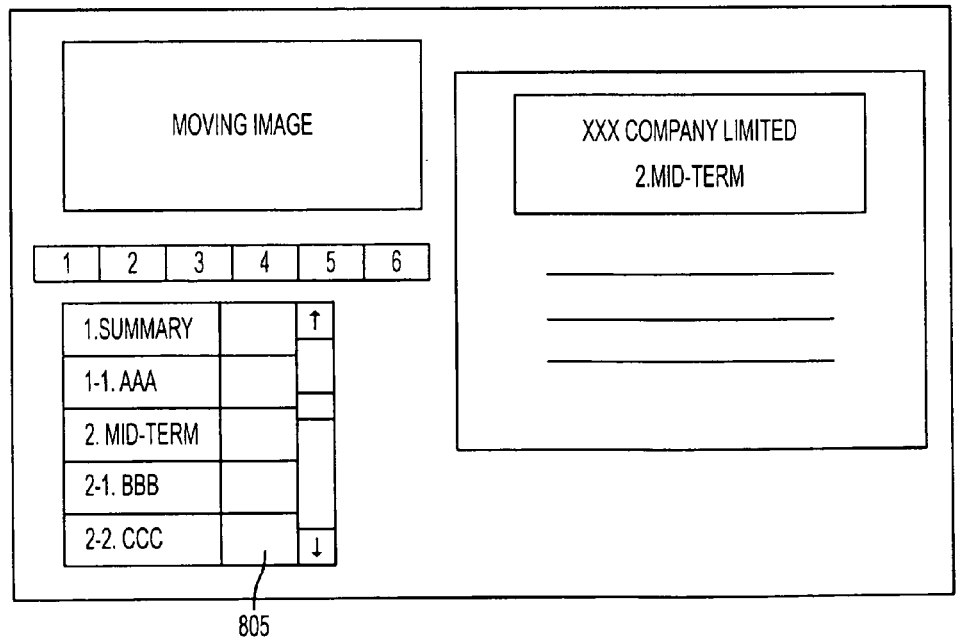
Figure 8C:
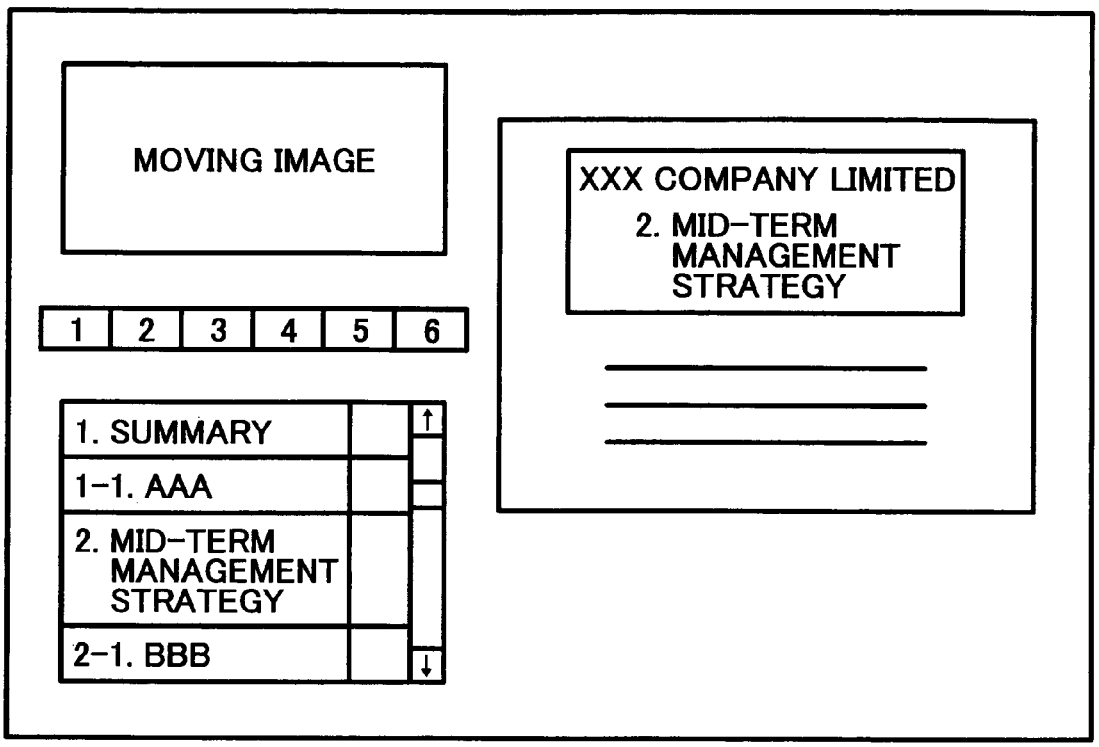
Figure 8D:
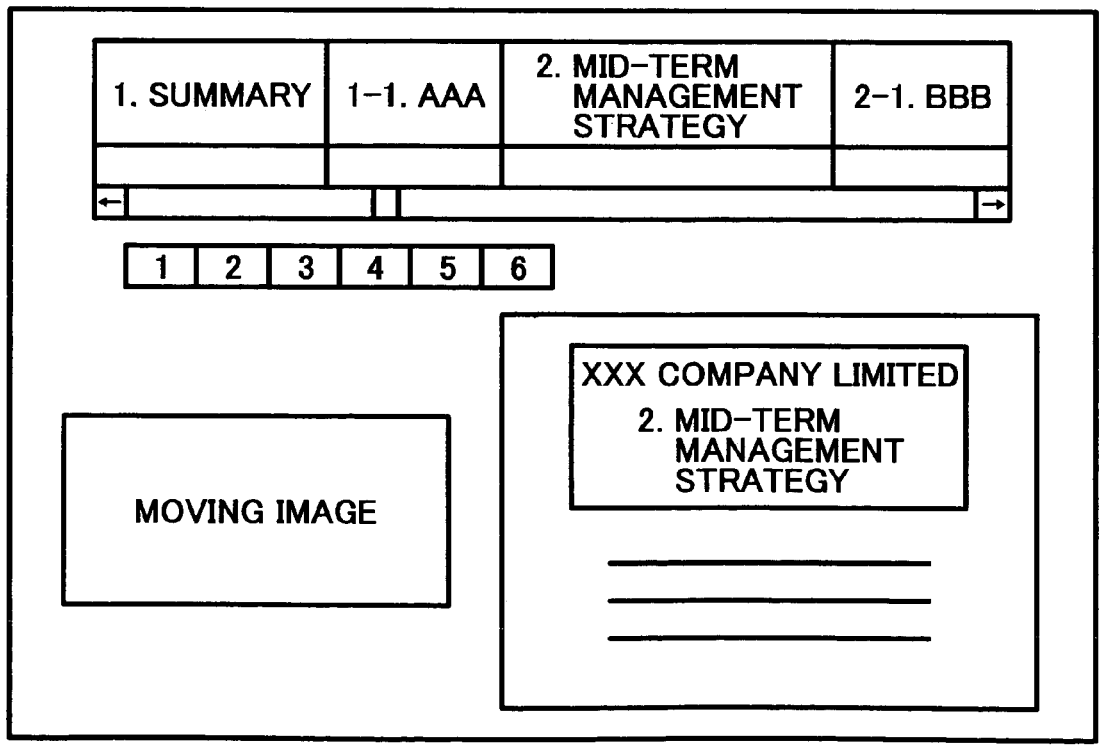

FIGS. 8A through 8D are diagrams for explaining display examples for each pattern of the index information. FIG. 8A depicts a display example of index information, moving image information, and screen information for the first pattern. FIG. 8B depicts a display example of index information, moving image information, and screen information for the second pattern. FIG. 8C depicts a display example of index information, moving image information, and screen information for the third pattern. FIG. 8D depicts a display example of index information, moving image information, and screen information for the sixth pattern.

As shown in FIGS. 8A through 8D, the screen has displayed thereon a screen image area 801 for displaying screen image information, a moving image area 802 for displaying the moving image information, an index button 803 for selecting a pattern of the index, and an index area 806 for displaying the index information. Also, as shown in FIGS. 8B through 8D, the thumbnail images, which are scaled-down images representing the screen image information, are displayed on one side of the index items (under the index items in FIG. 8D).

Next, an index generating process to be performed by the information editing device according to the present embodiment is described.

In the present embodiment, the information file generating unit 43 generates an information file by using an HTML format. Also, the information file may be generated by using synchronized multimedia integration language (SMIL). Here, SMIL is a language for controlling playback of data of various formats, such as moving images, still images, sounds, music, and characters, for synchronization, and is described in extensible markup language (XML). With the use of SMIL, a display position on the display screen, a display timing, a display period, etc., can be specified.

Figure 9:
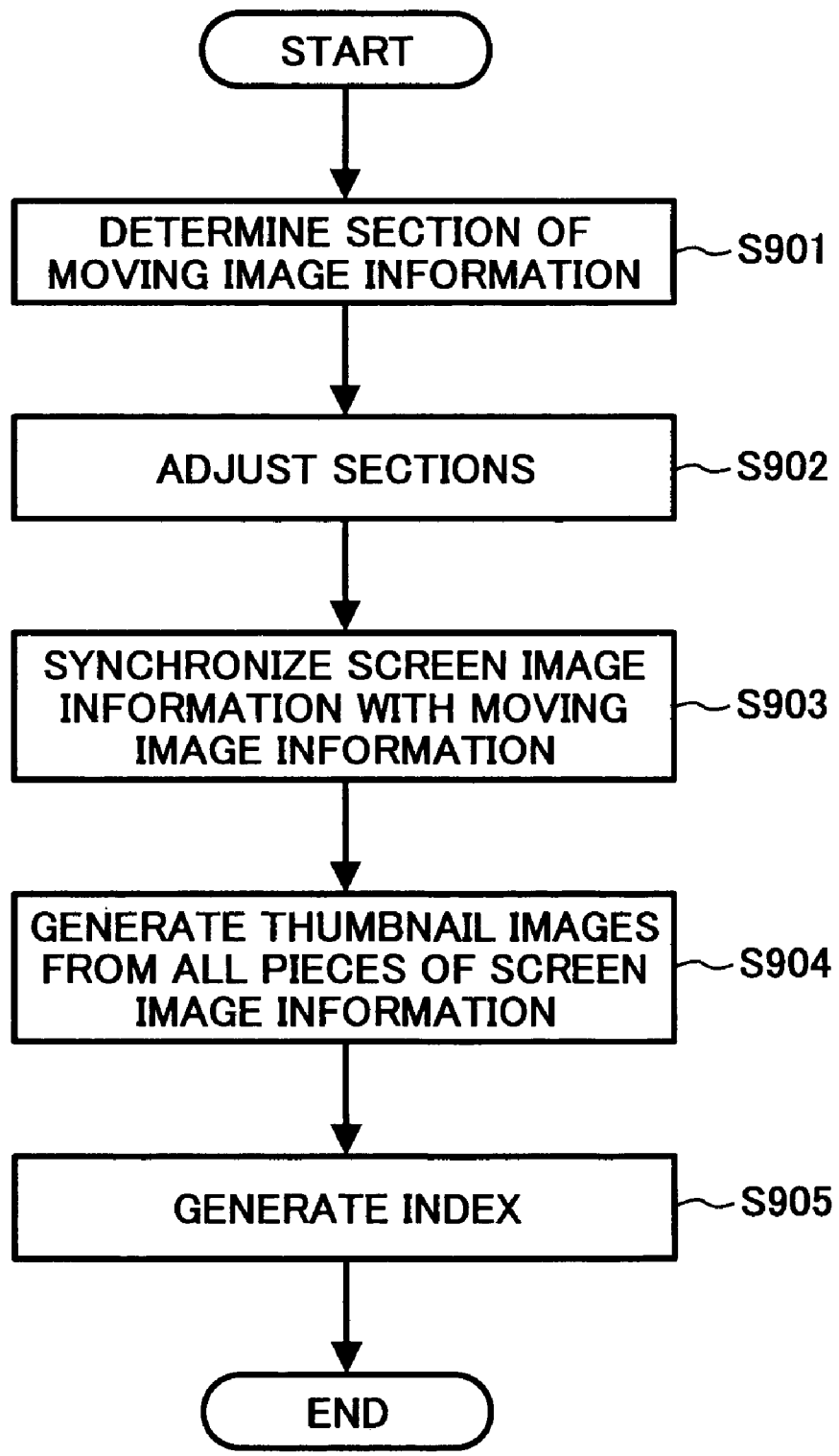
FIG. 9 is a flowchart of an information editing process that is performed by the information editing unit when generating the information file.

Next, an information editing process when the information editing unit 35 generates an information file is described. FIG. 9 is a flowchart of the procedure of the information editing process. First, the section determining unit 430 divides the moving image information 600 obtained from the DV camera 4 into a plurality of sections based on the event information 700 obtained from the presentation device 2 (step S901). Specifically, when successively-recorded two pieces of event information indicating "counter value: 3, event type: switch to page 2" and "counter value: 5, event type: switch to page 3" are received, it is determined that, of the moving image information 600, a section recorded from 10:10 to 10:16 corresponds to page 2. That is, the moving image information 600 is divided at positions of 10:10 and 10:16 as boundary positions.

Next, the section adjusting unit 431 adjusts the sections by comparing the length of each section determined by the section determining unit 430 with the prescribed length (step S902). Upon division of the moving image information into sections, the synchronizing unit 433 then synchronizes the moving image information 600 and the presentation document 31 based on the event information 700 (step S903), and then the synchronization adjusting unit 436 adjusts the synchronization. Here, section adjustment and synchronization adjustment are not described in detail.

Next, the thumbnail generating unit 439 generates thumbnail images, which are scaled-down images representing the screen image information (step S904). Then, an index is generated (step S905).

Figure 10:
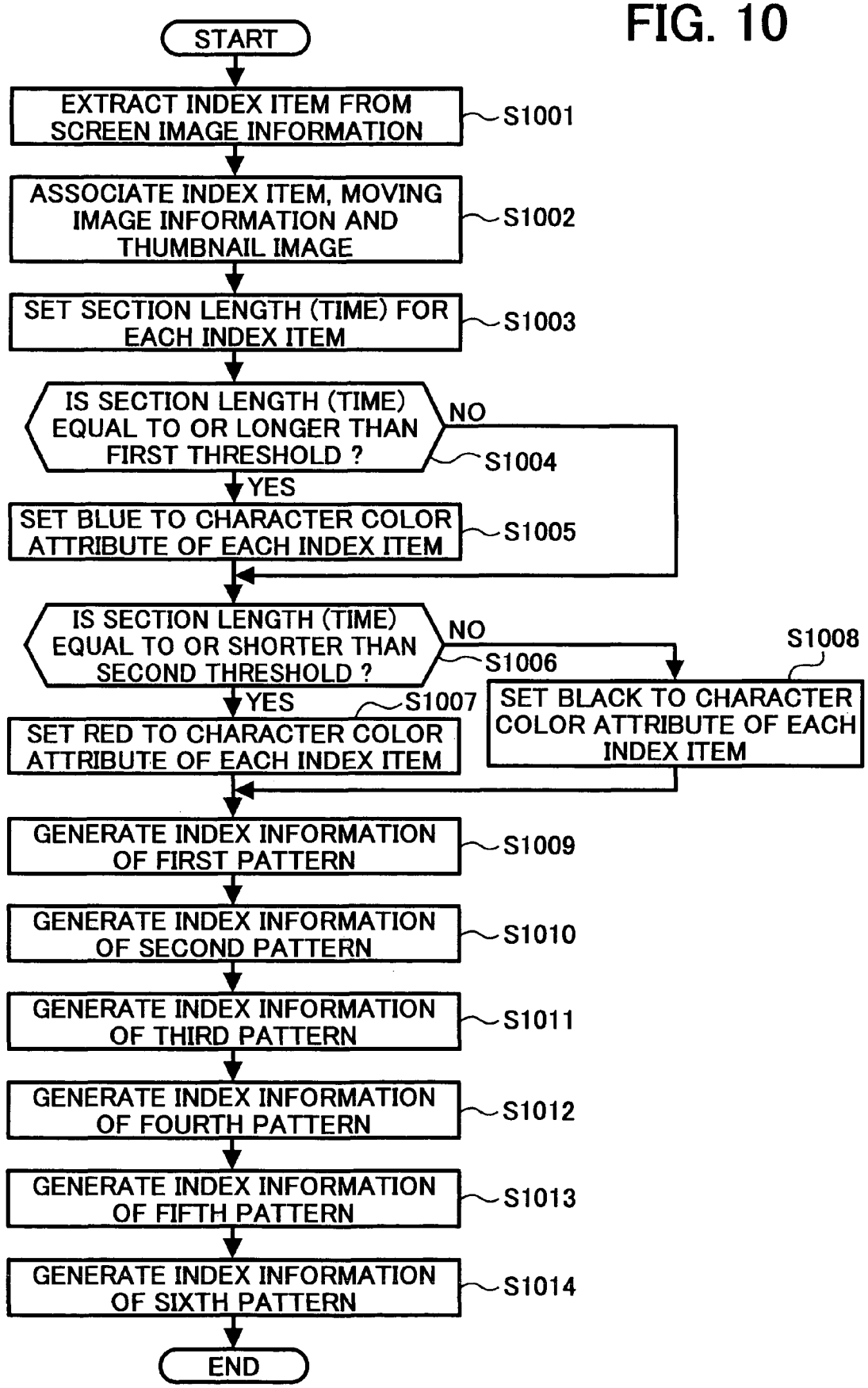
FIG. 10 is a flowchart of an index generating process.

Next, an index generating process in step S905 is described. FIG. 10 is a flowchart of the procedure of the index generating process. First, from the screen image information, the index-item extracting unit 434 extracts a character string to be taken as an index item (step S1001). Specifically, each screen image of the presentation document 31 includes character information provided with a title attribute. The index-item extracting unit 434 extracts the character information associated with the title attribute. The index-item extracting unit 434 extracts the character information from the screen images for all pages included in the presentation document 31. In the present embodiment, character information, such as "Theme: . . . " and "midterm management strategy", is described as the title attribute.

Next, the associating unit 435 associates the index items extracted by the index-item extracting unit 434 and the scaled-down images, that is, the thumbnail images, generated by the thumbnail generating unit 439 with the screen images (step S1002). Then, the index generating unit 438 sets, for each index item, a section length (that is, a display time) indicative of a length of the section determined in step S901 (step S1003).

Next, the index generating unit 438 checks for each index item whether the section length is equal to or longer than the first threshold (for example, three minutes) (step S1004). If the section length is equal to or longer than the first threshold, the index generating unit 438 sets "blue" to the character color attribute (step S1005).

Next, the index generating unit 438 checks for each index item whether the section length is equal to or shorter than the second threshold (for example, thirty seconds) (step S1006). If the section length is equal to or shorter than the second threshold, the index generating unit 438 sets "red" to the character color attribute (step S1007).

On the other hand, if the section length is not equal to or longer than the first threshold and not equal to or shorter than the second threshold, the index generating unit 438 sets "black" to the character color attribute (step S1008). With this, the character color of the index item can be changed according to the display time of the screen image. This makes it possible for the user to easily ascertain which piece of screen image information was described for a long time or for a short time.

The colors to be set to the character color attribute are not restricted to red, blue, and black, but may be arbitrary as long as they are different from one another. Also, the first threshold and the second threshold can be arbitrarily determined as long as the second threshold is smaller than the first threshold.

Next, the index generating unit 438 generates each index item of the first through sixth patterns of index information described above, and then records the generated index information in an information file (steps S1009 through 1014). Thus, the information file including the pieces of the index information as shown in FIG. 7 is generated, and is then stored in the information file DB 52.

Figure 11:
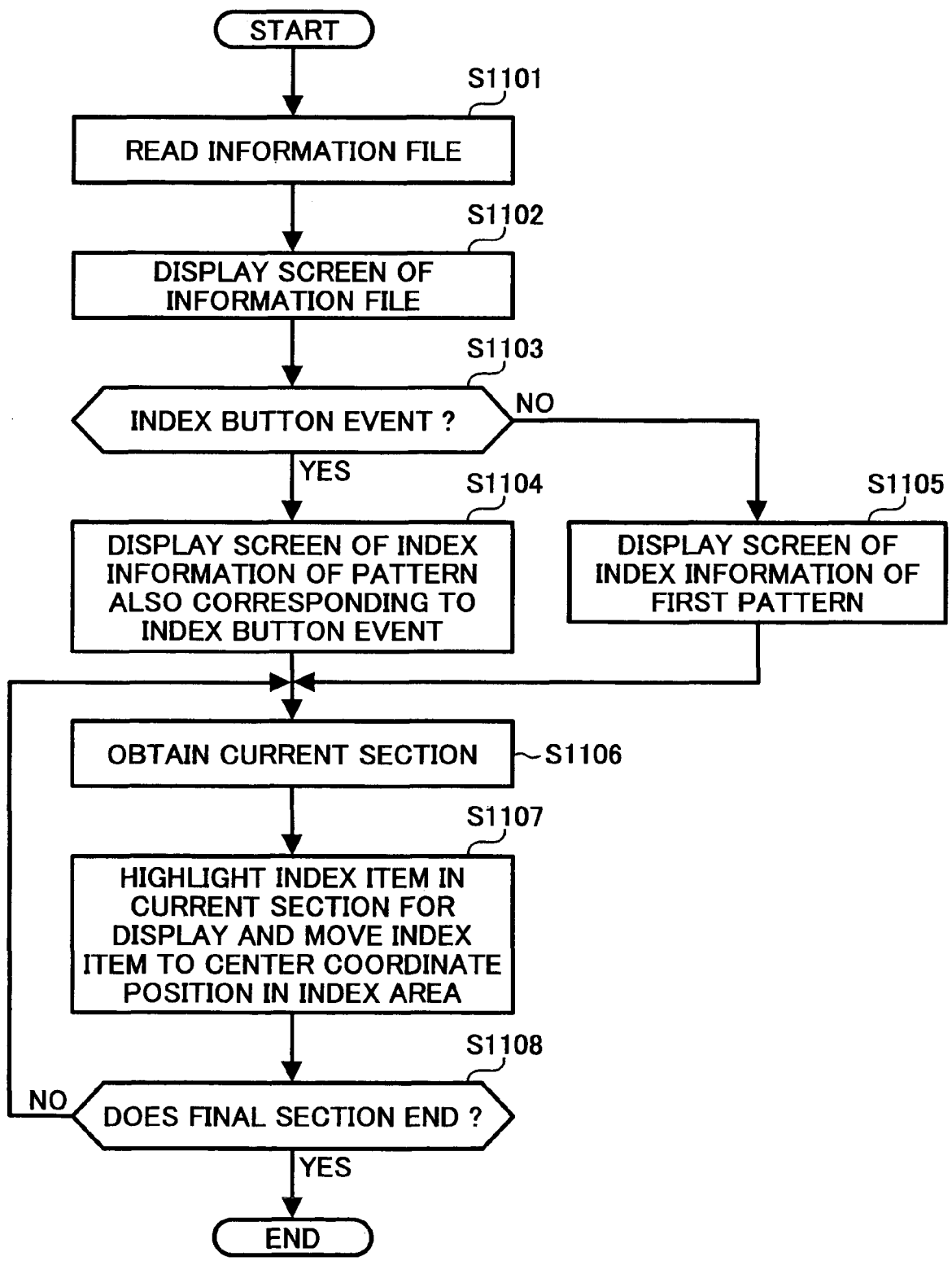
FIG. 11 is a flowchart of a display process that is performed by a display control unit shown in FIG. 2.

Next, a process of displaying the information file as shown in any one of FIGS. 8A through 8D is described. FIG. 11 is a flowchart of the procedure of the information file displaying process to be performed by the display controlling unit 53.

First, the display controlling unit 53 reads the information file from the information file DB 52 (step S1101), and then causes the information file to be displayed on the screen of the display device (step S1102). Then, the procedure enters a state of waiting for an input of an index button event reported from the instruction accepting unit 54 upon pressing of an index button on the screen (step S1103).

If an index button event is entered, a piece of index information of the pattern corresponding to the input index button event is read from the information file and is then displayed on the screen (step S1104). Examples of such display are shown in FIGS. 8A through 8D. On the other hand, if no index button event is entered for a predetermined time period, the index information of the first pattern is displayed on the screen as the default (step S1105). Switching the patterns of the index information can be made anytime upon pressing of the index button.

The display controlling unit 53 then obtains, from the information file, the section of the moving image information currently being displayed (step S1106), and then causes an index item in the current section to be highlighted for display and be moved to the center coordinates of the index area (step S1107). Then, the processes at steps S1106 and S1107 are repeated until the last section of the moving image information and the screen images ends. In this manner, a plurality of pieces of index information can be switched for display. Also, the index item corresponding to the currently-proceeding screen image is always displayed at the center of the index area, thereby allowing automatic scrolling of the index information.

Also, as shown in FIGS. 8B through 8D, when the index information includes thumbnail images for display, clicking an arbitrary thumbnail image with the mouse or the like causes the display controlling unit 53 to obtain a position of the thumbnail image as an event and make a popup display of the specified thumbnail image on the screen shown in FIGS. 8B through 8D. In the present embodiment, the moving image information is displayed on the moving image display area, but a still image can be displayed thereon.

Figure 12:
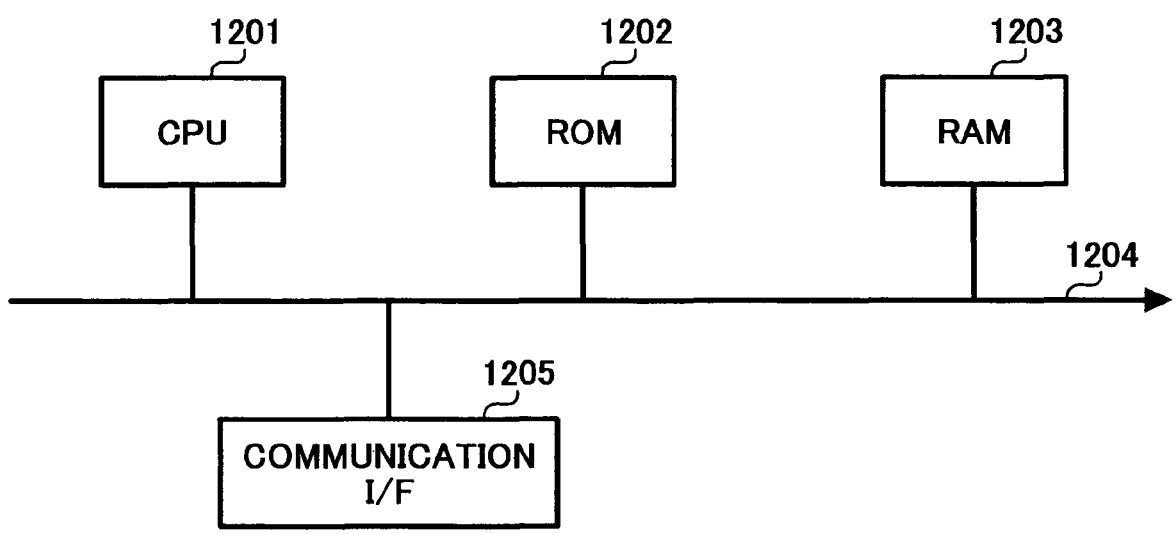
FIG. 12 is hardware structure of the information editing device shown in FIG. 1.

FIG. 12 is a hardware structure of the information editing device 5. The information editing device 5 includes a central processing unit (CPU) 1201 that controls each component of the information editing device 5 based on programs, such as an information editing program for use in the information editing unit 35, stored in read-only memories (ROMs) 1202 and 1202; a random-access-memory (RAM) 1203 having formed therein a work area and having stored therein various data required for controlling the information editing device 5; a communication interface (I/F) 1205 connected to a network for communication; and a bus 1204 for connecting the components with one another.

An information providing program for performing an information providing process in the information editing device 5 described above is provided as being recorded on a computer-readable recording medium, such as a CD-ROM, a floppy disk (FD), and digital versatile disk (DVD), in an installable or executable format.

Also, the information providing program according to the present embodiment may be provided as being stored in a computer connected to a network, such as the Internet, and then being downloaded via the network.

In this case, the information providing program is read from the recording medium and executed by the information editing device 5, and is thus loaded on a main storage device. With this, each unit described above in the software structure is generated on the main storage device.

Also, the hardware structure of the presentation device 2 is similar to the hardware structure of the information editing device 5 described with reference to FIG. 18, and is therefore not described herein.

The information providing system according to the embodiment described above can be modified or improved in various manners.

As described above, in the information editing device according to the present embodiment, the index information indicative of a list of pieces of screen image information for each scene is generated in different patterns. The generated pieces of index information are switched for display based on an input instruction of the user. This makes it possible to select, as appropriate, one of the plurality of pieces of index information including the screen image information or the moving image information corresponding to the screen image information, and then to search for desired screen image information or moving image information. Thus, the screen image information and the moving image information corresponding to the screen image information can be efficiently edited and viewed.

Although the invention has been described with respect to a specific embodiment for a complete and clear disclosure, the appended claims are not to be thus limited but are to be construed as embodying all modifications and alternative constructions that may, occur to one skilled in the art which fairly fall within the basic teaching herein set forth.

What is claimed is:

1. An information editing device that allows viewing on a display-of screen image information for each scene that proceeds with time and moving image data recorded at the scene corresponding to the screen image information, the information editing device comprising:
a display controlling unit that displays on the display the screen image information and the moving image data corresponding to the screen image information, and displays first thumbnail information and second thumbnail information obtained by scaling down the screen image information,
wherein in a condition where the screen image information, the moving image data, the first thumbnail information indicating a same content as the screen image information, and the second thumbnail information not indicating the same content as the screen image information are displayed on the display, the display controlling unit further displays, in response to an input instruction of the user and separately from the first and second thumbnail information displayed on the display, third thumbnail information indicating a same content as the second thumbnail information displayed on the display.

2. The information editing device according to claim 1, further comprising:
an index generating unit that generates, in a plurality of different formats, a plurality of pieces of index information indicative of a list of pieces of screen image information each for one scene.

3. The information editing device according to claim 2, further comprising:
a thumbnail generating unit that generates the first thumbnail information obtained by scaling down the pieces of screen image information so that the first thumbnail information can be displayed in a list form, wherein the index generating unit generates the pieces of index information by associating index items included in the pieces of index information with the first thumbnail information.

4. The information editing device according to claim 3, wherein the display controlling unit provides a control to display a piece of screen image information corresponding to a thumbnail image included in the first thumbnail information.

5. The information editing device according to claim 2, wherein the index generating unit generates the index information with a display state being changed based on a display time duration of each of the pieces of screen image information for one scene and when a display time is longer than a predetermined first threshold or when the display time is shorter than a predetermined second threshold, the index generating unit generates the index information with a display attribute of an index item corresponding to the display time being changed to a display attribute of another index item.

6. The information editing device according to claim 5, wherein the display controlling unit provides a control to display an index item included in the index information with a length corresponding to the display time duration of each of the pieces of screen image information.

7. The information editing device according to claim 2, wherein the display controlling unit provides a control to display each index item included in the index information to be scrolled according to the progress of the scenes.

8. An information editing method that allows viewing on a display of screen image information for each scene that proceeds with time and moving image data recorded at the scene corresponding to the screen image information, the information editing method comprising:
  displaying on the display screen image information, the moving image data corresponding to the screen image information, first thumbnail information and second thumbnail information obtained by scaling down the screen image information,
  wherein in a condition where the screen image information, the moving image data, the first thumbnail information indicating a same content as the screen image information, and the second thumbnail information not indicating the same content as the screen image information are displayed on the display, the display controlling unit further displays, in response to an input instruction of the user and separately from the first and second thumbnail information displayed on the display, third thumbnail information indicating a same content as the second thumbnail information displayed on the display.

9. The information editing method according to claim 8, further comprising:
  generating, in a plurality of different formats, a plurality of pieces of index information indicative of a list of pieces of screen image information each for one scene.

10. The information editing method according to claim 9, further comprising:
  generating the first thumbnail information obtained by scaling down the pieces of screen image information so that the first thumbnail information can be displayed in a list form, wherein the generating pieces of index information includes generating pieces of index information by associating index items included in the pieces of index information with the first thumbnail information.

11. The information editing method according to claim 10, wherein the display controlling includes providing a control to display a piece of screen image information corresponding to a thumbnail image included in the first thumbnail information.

12. The information editing method according to claim 9, wherein the generating pieces of index information includes generating the index information with a display state being changed based on a display time duration of each of the pieces of screen image information for one scene and when a display time is longer than a predetermined first threshold or when the display time is shorter than a predetermined second threshold, the generating pieces of index information includes generating the index information with a display attribute of an index item corresponding to the display time being changed to a display attribute of another index item.

13. The information editing method according to claim 12, wherein the display controlling includes providing a control to display an index item included in the index information with a length corresponding to the display time duration of each of the pieces of screen image information.

14. The information editing method according to claim 9, further comprising:
  display controlling by switching the pieces of index information based on the input instruction, wherein the display controlling includes providing a control to display each index item included in the index information to be scrolled according to the progress of the scenes.

15. A non-transitory computer-readable recording medium that stores a computer program that contains instructions which when executed on a computer cause the computer to realize an information editing method that allows viewing on a display of screen image information for each scene that proceeds with time and moving image data recorded at the scene corresponding to the screen image information, the computer program making the computer execute:
  displaying on the display screen image information, the moving image data corresponding to the screen image information, first thumbnail information and second thumbnail information obtained by scaling down the screen image information,
  wherein in a condition where the screen image information, the moving image data, the first thumbnail information indicating a same content as the screen image information, and the second thumbnail information not indicating the same content as the screen image information are displayed on the display, the display controlling unit further displays, in response to an input instruction of the user and separately from the first and second thumbnail information displayed on the display, third thumbnail information indicating a same content as the second thumbnail information displayed on the display.

16. A non-transitory computer-readable recording medium according to claim 15, further comprising:
  generating, in a plurality of different formats, a plurality of pieces of index information indicative of a list of the pieces of screen image information each for one scene; and
  display controlling by switching the pieces of index information based on a second input instruction,
  wherein the generating pieces of index information includes generating the index information with a display state being changed based on a display time duration of each of the pieces of screen image information for one scene, and the display controlling includes providing a control to display an index item included in the index information with a length corresponding to the display time duration of each of the pieces of screen image information.

* * * * *